Mar. 6, 1923.
W. J. WALCH
FEMALE GAUGE
Filed July 24, 1919
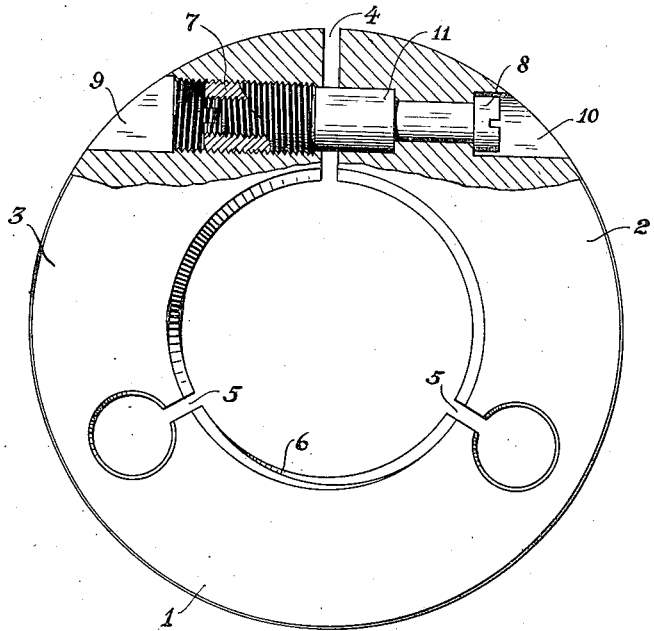
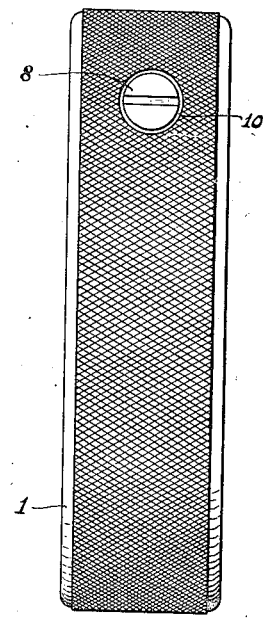
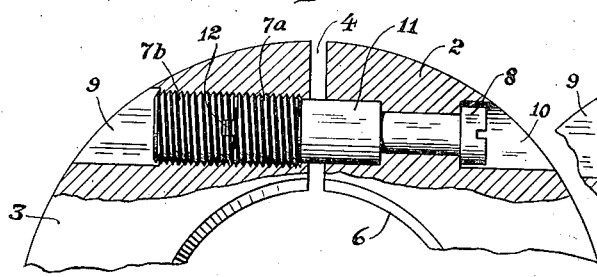
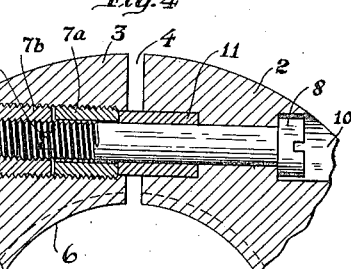
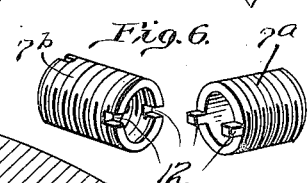
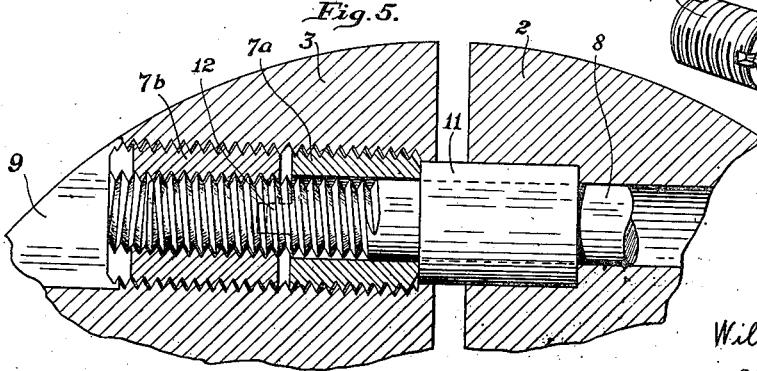
Inventor
William J. Walch
By S. Jay Teller
Attorney.

Patented Mar. 6, 1923.

1,447,448

UNITED STATES PATENT OFFICE.

WILLIAM J. WALCH, OF HARTFORD, CONNECTICUT, ASSIGNOR TO PRATT & WHITNEY COMPANY, OF NEW YORK, N. Y., A CORPORATION OF NEW JERSEY.

FEMALE GAUGE.

Application filed July 24, 1919. Serial No. 312,974.

*To all whom it may concern:*

Be it known that I, WILLIAM J. WALCH, a citizen of the United States, residing at Hartford, in the county of Hartford and State of Connecticut, have invented certain new and useful Improvements in Female Gauges, of which the following is a specification.

The invention relates to gauges having relatively adjustable sections, and particularly to female gauges of the split body type. In accordance with the invention, I have provided a gauge of this type which can be readily adjusted and in which the parts are rigidly held in adjusted relationship, the gauge at the same time being more simple and compact in construction than other earlier gauges. The several adjusting and holding elements are arranged coaxially, thus occupying the minimum space and making it possible for the gauge body to be much smaller than would otherwise be necessary.

In the accompanying drawing I have shown two embodiments of the invention, but it will be understood that the drawing is merely for purposes of illustration and is not to be construed as defining or limiting the scope of the invention, the accompanying claims being relied upon for that purpose.

Of the drawing:

Fig. 1 is a front view of a gauge embodying the invention, certain parts being shown in section.

Fig. 2 is an end view.

Fig. 3 is a fragmentary view similar to Fig. 1 but showing a different embodiment of the invention.

Fig. 4 is a view similar to Fig. 3 but showing some of the adjusting and holding elements in section.

Fig. 5 is a view on an enlarged scale showing in an exaggerated manner the possible looseness in the threads.

Fig. 6 is a detail perspective view of the two-part adjusting element comprised in the modified form of the invention.

Referring to the drawing, 1 represents a gauge body having two relatively adjustable sections 2 and 3. The invention is particularly applicable to a female gauge of the split body type, and I have therefore shown a body of this form, the body being integral and having a kerf or split at 4 separating the two sections 2 and 3. Preferably there are one or more other kerfs as at 5—5 which do not extend entirely through the body, these kerfs reducing the cross-sectional area of the body and permitting the sections 2 and 3 to be more readily adjusted. In the case of a female gauge such as shown, there is provided an interior gauge surface 6 which is adapted to contact with parts to be gaged. I have illustrated this surface as conforming to screw threads, but it will be understood that as to this there may be variation, as a different surface may be provided as for instance a smooth cylindrical one. I have shown the gauge body as being cylindrical in external form, and this is preferable for many classes of work. However, as concerns several of the features of my invention, I do not limit myself to the cylindrical form.

For relatively adjusting the two sections 2 and 3, and for locking them after adjustment, I provide two alined screws 7 and 8. These screws are so arranged that one of them as for instance 7, is adapted to separate the ends of the body and thereby increase the effective size of the gauge, and the other of them, as for instance 8, is adapted to draw together the ends of the body and thereby reduce the effective size of the gauge. It will be seen that these two screws are adapted to oppose each other and thus rigidly lock the two gauge sections in adjusted relationship. By preference these screws are provided respectively at their opposite outer ends with means whereby they may be turned, these means as shown being in the form of slots adapted to be engaged by a screw driver or similar tool. The two screws preferably extend into or are located in alined apertures 9 and 10 in the two end sections 2 and 3 of the gauge body. The screw 7 is threaded into the aperture 9 and the screw is provided with a central aperture which is preferably threaded. The screw 8 fits the aperture 10 and extends into the threaded aperture in the screw 7.

For holding the two sections 2 and 3 against relative transverse movement, I preferably provide a sleeve 11 which surrounds the screw 8 and is in direct endwise association with the screw 7, preferably, however, being separate therefrom. The sleeve 11 is seated in apertures in the ends of the body and therefore serves as a dowel to prevent relative transverse movement of the said ends. It will be seen that with this construction the sleeve is interposed between the screw 7 and the opposite gauge section 2, the action of the screw being transmitted through the sleeve.

It will be seen that the sleeve 11 extends for a considerable distance into one of the gauge sections, as for instance 2, but is entered for only a very short distance in the other section, as for instance 3. This is an advantageous arrangement as it prevents any appreciable tendency to bind or clamp the sleeve as the two sections are relatively adjusted inward or outward. It will be seen that with a longer sleeve having extended bearings in both sections the sleeve, if tightly fitted, would either be bent or would interfere with the adjustment of the sections. If the sleeve were made loose enough to eliminate this bending or interfering tendency it would be practically useless as a dowel. By my improved construction, as shown, the bearing of the sleeve in the section 3 is so short that any bending or interfering tendency such as referred to is entirely avoided. The sleeve can have a very close fit in the respective sections, and thus the sections are held in register without the possibility of lost motion.

After the parts of the gauge have been assembled, as shown, the effective size of the gauge can be increased by loosening the screw 8 and then turning the screw 7 sufficiently to separate the sections 2 and 3 to the desired extent. After the desired separation is reached the parts are locked by tightening the screw 8. The effective size of the gauge can be reduced by turning the screw 7 to an extent depending on the amount of reduction desired, and then turning the screw 8 so as to draw the two sections together to the extent permitted by the aforesaid turning of the screw 7 and to lock them.

In the case of gauges which are likely to receive hard or careless usage, it is preferable to provide a somewhat different construction, as illustrated in Figs. 3 to 5. It will be seen that with the construction shown in Fig. 1 a single set of threads on the exterior of the screw 7 is depended upon for holding the gauge sections in relative adjustment. If there is any looseness of fit at these threads this would obviously permit the gauge to be sprung outward or inward, as the case might be, to temporarily increase or reduce the effective size to a slight extent without any turning of the screws.

To avoid this possibility, I have provided, as shown in Figs. 3 to 5, a two-part adjusting member or screw in lieu of the one-part adjusting member or screw 7 shown in Fig. 1. The two parts of the adjusting member are indicated respectively by 7ª and 7ᵇ. These are provided with a tongue-and-groove connection, as illustrated at 12, tongue members at diametrically opposite sides of the part 7ª fitting in corresponding grooves in the part 7ᵇ, and they are thus adapted for simultaneous rotation but are relatively movable longitudinally to a slight extent. The part 7ª of the adjusting member is threaded into the aperture 9 and engages the sleeve 11, as does the screw 7 shown in Fig. 1. When this part 7ª is turned by means of the part 7ᵇ it serves to separate the gauge sections 2 and 3. The part 7ª is provided with a central aperture and the screw 8 extends not only through the sleeve 11 but also through the screw part 7ª. This screw 8 is threaded into the outer part 7ᵇ of the adjusting member and this outer part is preferably threaded to engage the threads in the aperture 9. It will be seen that the screw 8 is adapted to serve, as in the construction illustrated in Fig. 1, to draw the two gauge sections 2 and 3 together and to lock them.

In Fig. 5 I have illustrated the parts 7ª and 7ᵇ on a larger scale, and I have illustrated in an exaggerated manner the looseness of fit which may exist at the threads. The engagement of the part 7ª with the sleeve 11 serves to hold the said part in its outermost position in the threads, as shown. If the screw 8 were threaded into the part 7ª, as is the case in the construction shown in Fig. 1, then the tension of the screw would simply serve to hold the part 7ª in firmer engagement with the sleeve 11, and the gauge section 3 would be free to be sprung outward to a slight extent as permitted by the looseness at the threads. However, the screw 8, instead of being threaded into the part 7ª extends through this part and is threaded into the part 7ᵇ. The tension of the screw 8 serves to draw the part 7ᵇ inward, thus applying inward pressure not only to the said part but also to the gauge section 3. The screw 8 serves to hold the said part 7ᵇ in its innermost position in the threads as shown. The two parts 7ª and 7ᵇ act on the threads in opposite directions and lost motion or play is eliminated.

Thus the gauge sections 2 and 3 are rigidly and positively held against relative inward movement by the threads on the part 7ª and against relative outward movement by the threads on the part 7ᵇ. At the same time the sleeve 11 surrounding the screw 8 serves to positively hold the gauge sections 2 and 3 against relative transverse movement. In this way the several described elements cooperate to hold the gauge sections against any relative movement, but are nevertheless adapted to readily permit and effect adjustment at any time. If desired the adjusting and holding elements may be sealed in a suitable manner as for instance by placing sealing wax in the apertures 9 and 10.

What I claim is:

1. The combination in a female gauge, of an adjustable split body having an interior gauge surface adapted to contact with parts to be gaged, a sleeve seated in and closely fitting apertures in the ends of the body for holding them against relative transverse movement, the bearing in one end being relatively long and in the other very short whereby freedom of adjustment is permitted, and means in alinement with the sleeve and extending in part therethrough for separating and drawing together the ends of the body.

2. The combination in a female gauge, of an adjustable split body having an interior gauge surface adapted to contact with parts to be gaged, a sleeve seated in and closely fitting apertures in the ends of the body for holding them against relative transverse movement, the bearing in one end being relatively long and in the other very short whereby freedom of adjustment is permitted, and two alined screws, one in the last said end bearing against the sleeve and adapted to separate the said ends of the body and thereby increase the effective size of the gauge and the other extending through the sleeve and adapted to draw together the said ends of the body and thereby reduce the effective size of the gauge.

3. The combination in a gauge, of two relatively adjustable sections, an adjusting member associated with one section and comprising two parts connected for simultaneous rotation but relatively movable longitudinally, and means associated respectively with the two parts of the adjusting member for separating and drawing together the said gauge sections.

4. The combination in a gauge, of two relatively adjustable sections, an adjusting member associated with one section and comprising two parts connected for simultaneous rotation but relatively movable longitudinally, one part being centrally apertured and having threaded engagement with the said section and serving when turned to separate the two gauge sections and the other part having a central threaded aperture, and a screw extending through the aperture in the first part of the adjusting member and threaded into the second part thereof and serving to draw together the said gauge sections.

5. The combination in a gauge, of two relatively adjustable sections, a sleeve seated in apertures in the gauge sections for holding them against relative transverse movement, an adjusting member associated with one section and comprising two parts connected for simultaneous rotation but relatively movable longitudinally, one part being centrally apertured and engaging the sleeve and having threaded engagement with the said section so that it serves when turned to separate the said gauge sections and the other part having a central threaded aperture, and a screw extending through the sleeve and through the first part of the adjusting member and threaded into the second part so that it serves when turned to draw together the said gauge sections.

6. The combination in a gauge, of two relatively adjustable sections, a screw threaded into one section and comprising two parts connected for simultaneous rotation but relatively movable longitudinally as permitted by looseness of fit at the threads, and means associated respectively with the two parts of the screw for separating and drawing together the said gauge sections.

7. The combination in a gauge, of two relatively adjustable sections, a screw threaded into one section and comprising two parts connected for simultaneous rotation but relatively movable longitudinally as permitted by looseness of fit at the threads, one part being centrally apertured and serving when turned to separate the said gauge sections and the other part having a central threaded aperture, and a second screw extending through the first part of the first screw and threaded into the second part thereof and serving to draw together the said gauge sections.

8. The combination in a female gauge, of an adjustable split body having an interior gauge surface adapted to contact with parts to be gaged, a sleeve seated in apertures in the ends of the body adjacent the split for holding them against relative transverse movement, a screw threaded into one end section and comprising two parts connected for simultaneous rotation but relatively movable longitudinally as permitted by looseness of fit at the threads, one part being centrally apertured and bearing against the sleeve and serving when turned to separate the said ends of the body and the other part having a central threaded aperture, and a second screw extending through the sleeve and through the first part of the first screw and threaded into the second part thereof and serving to draw together the said ends of the body.

In testimony whereof, I hereto affix my signature.

WILLIAM J. WALCH.